Dec. 29, 1964 E. W. BAUER 3,163,852
MAGNETIC CORE HALF ADDER
Filed Sept. 6, 1956 3 Sheets-Sheet 1

INVENTOR.
EDWIN W. BAUER
BY John E. Dougherty Jr.
AGENT 3,163,852
Patented Dec. 29, 1964

3,163,852

MAGNETIC CORE HALF ADDER

Edwin W. Bauer, Poughkeepsie, N.Y., assignor to International Business Machines Corporation, New York, N.Y., a corporation of New York Filed Sept. 6, 1956, Ser. No. 608,227
26 Claims. (Cl. 340—174)

The present invention is related to magnetic devices and more particularly binary half adder circuitry which utilizes the storage and switching properties of magnetic materials.

Binary half adders are devices having two input terminals, to which signals representative of binary information to be added are applied, and two output terminals at which there are developed sum and carry signals which are representative of binary addition of the information applied to the input terminals. In order to achieve the desired outputs, it is necessary that a binary half adder be capable of performing both the "AND" and "EXCLUSIVE OR" logical functions. Vacuum tube and crystal diode circuits capable of performing these functions are, of course, well known in the art, as is the utilization of combinations of these circuits to perform the logical functions of a binary half adder. Recently the marked advantages attendant the incorporation of magnetic cores, as storage elements, in computing and data handling devices have stimulated efforts to utilize cores in logical circuitry. The present invention is the result of such efforts and has as a prime object the provision of an improved magnetic core binary half adder.

This object is achieved, according to one embodiment of the invention, by utilizing a single toroidal core having pierced therein a pair of holes or openings through which the input windings are positioned, and a pair of openings remote from the input openings through which the output windings are positioned. Each of the input windings is wound in a figure eight fashion through one of the input holes in such a manner that each embraces the core material on each side of the hole. The input windings are wound through the second input hole so that one winding embraces the core material on one side of this hole and the other embraces the core material on the other side of this hole. The input windings are, with respect to the localized circular flux paths which exist in the portions of the magnetic core material around the periphery of each hole, wound in an opposite sense. A reset winding is provided to initially reset the core to a remanent condition in one direction. The application of an input pulse to either input winding, exclusively, is effective to "kidney" the flux in the core material remote from the input holes, that is to reverse the direction of flux along an inner radial portion of the core which is remote from the input holes. This "kidneying" effect is explained in greater detail in the copending application, Serial No. 546,180, filed November 10, 1955, in behalf of Lloyd P. Hunter, now U.S. Patent 2,869,112, and assigned to the assignee of this application. The application of input pulses to both input windings is effective to reverse the direction of flux throughout the core. A sum output winding is provided which is wound in a figure eight fashion to embrace, with opposite sense winding loops, the inner and outer radial portions of the core material at a point remote from the input holes. Thus, when either input winding is energized, exclusively, an output is induced in the portion of the sum output winding which links the inner portion of the core. When both inputs are energized coincidently equal and opposite outputs are induced in each of the figure eight sections of the sum output winding which outputs cancel each other. The carry output winding links only the outer radial portion of the core and has induced therein an output only when both inputs are energized coincidently. Thus, the energization of either input exclusively is effective to reverse the flux in the inner portion only, and the energization of both inputs coincidently is effective to reverse the flux direction in the entire core. Since both of these states as well as the initial state of the core are stable states, the subsequent application of a reset pulse is effective to cause to be manifested at the sum and carry windings the result of binary addition of whatever inputs were applied to the core.

According to a second embodiment of the invention the magnetic core switching elements is provided with two pierced holes. Through the first of these holes the two input windings are threaded so that one winding embraces a radial portion of the core on one side of the hole and the other embraces a radial portion of the core on the other side of the hole. The sum output winding and the carry output winding are threaded through the second pierced hole, the sum winding being wound in figure eight fashion and the carry winding being wound to embrace only the outer radial portion of the core. The operation of this device is similar to that of the first embodiment, the energization of either input pulse exclusively, when the core is in an initial reset state of flux remanence being effective to "kidney" the flux in the core and produce an output on the sum winding only, and the energization of both input windings coincidently being effective to reverse the direction of flux throughout the core and produce an output in the carry winding only. Also, each of the three states are stable and are distinguishable upon the subsequent application of an interrogation signal to the circuit.

According to a third embodiment of the invention two cores are utilized, each having a hole pierced therein to receive input windings. In operation, one core performs the logical "EXCLUSIVE OR" function and produces an output on a sum winding, which embraces it, when either input winding is energized exclusively and the second core performs the logical "AND" function and produces an output when both inputs are energized coincidently. In a manner similar to that of the single core embodiments, the binary half adder of this embodiment is capable of producing outputs both upon application of the binary information signals and at a later time in response to an interrogation signal. An advantage incorporated in this two core binary adder lies in the fact that it is capable of operation with input pulses of either polarity.

Thus, another object of the invention is to provide binary half adder circuitry which is capable of both producing sum and carry output signals in response to binary information signals applied to its input terminals and also storing the result of the binary addition of the input information in such a manner that sum and carry signals may be produced at a later time in response to an interrogation signal.

A further object is to provide such circuitry utilizing as a switching and storage element a single magnetic element.

A feature of the invention lies in the provision of a logical circuit which has three distinguishable stable states of equilibrium for representing different logical combinations of information signals applied to a pair of input terminals and which is capable of storing the logical result of the input combination for reproduction at a later time in response to an interrogation signal.

Another feature of the invention lies in the provision of such logical circuitry using a magnetic core as a switching element wherein the information signals may be very large and the switching operations accomplished at exceedingly high speeds.

Another feature of the invention lies in the provision of a magnetic core binary adder capable of operation with inputs of either polarity.

Other objects of the invention will be pointed out in the following description and claims and illustrated in the accompanying drawings, which disclose, by way of example, the principle of the invention and the best mode, which has been contemplated, of applying that principle.

Figure 1:
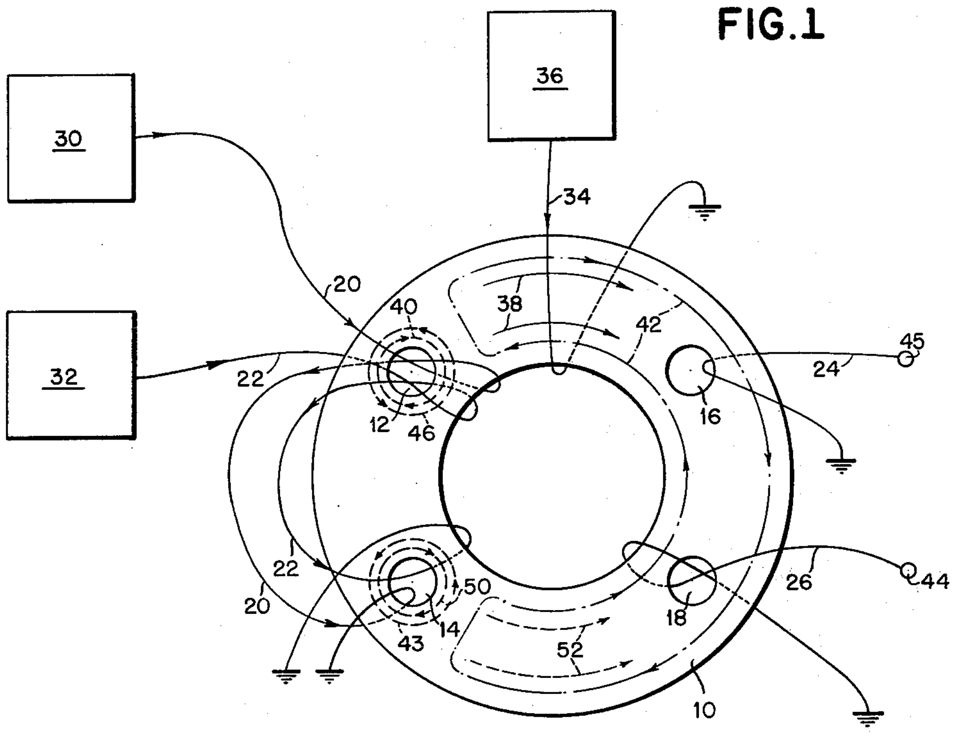
FIGS. 1 and 2 are schematic showings of different embodiments of single magnetic core binary half adders constructed according to the principles of the invention.

Referring now to FIG. 1, it may be seen that the binary half adder there shown consists essentially of a core 10 of magnetic material which is pierced at points along its longitudinal axis with openings 12, 14, 16 and 18, through which a pair of input windings 20 and 22, and a pair of output windings 24 and 26 are threaded to embrace portions of the core material. The holes 12, 14, 16 and 18, may be considered to divide the core material into two circular portions, one existing primarily between the inner circumference of the core and the circle defined by the innermost portions of the holes and the other existing primarily between the outer circumference of the core and the circle defined by the outermost portions of the holes. These two circular portions of the core may be considered as inner and outer flux paths, or two magnetic circuits which are part of a larger or complete magnetic circuit in the same sense that a complete electrical circuit may be considered to include a number of constituent circuits or current paths. The manner in which the various windings are inductively associated with these paths or circuits will now be explained.

The windings designated 20 and 22 are input windings to which signals, representative of binary information to be added, are applied. Each of these windings is threaded in figure eight fashion through the pierced hole 12 so that one portion of each winding embraces the adjacent inner radial segment of the core and another portion of each embraces the adjacent outer radial segment on the core. Each winding is threaded in a figure eight fashion so that when energized it will be effective to apply magnetomotive forces in different directions to the inner and outer portions of the core it links.

Input pulses are supplied to the windings 20 and 22 by the pulse sources 30 and 32, respectively, and the construction is such that each pulse source supplies pulses to the associated winding effective to cause current flow in the direction indicated by the arrows on each winding. With respect to the pulses applied by these pulse sources the windings 20 and 22 are threaded through hole 12 in such a manner that when energized the magnetomotive forces applied by each to both the inner and outer portions of core 10 are in opposite directions. Windings 20 and 22 are also threaded through hole 14, so that winding 20 embraces the outer portion and winding 22 embraces the inner portion of core 10. Winding 24 is the carry output winding and is threaded through hole 16 so as to embrace only the outer portion of core 10. Winding 26 is the sum output winding and is threaded in figure eight fashion through hole 18 to embrace both the inner and outer portions of core 10.

Figure 4:
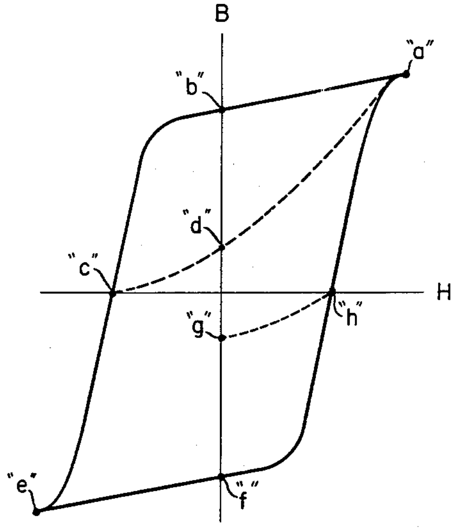
FIG. 4 is a diagrammatic representation of a B-H characteristic curve for a toroidal core such as might be used in practicing the invention.

In order to initiate operation of the binary half adder it is first necessary to reset the flux throughout the core to the direction indicated by the arrows designated 38. For this purpose a reset winding 34 is provided which winding is energized by a pulse source 36. The construction of pulse source 36 is such that it is effective to apply a current pulse in the direction shown to the winding 34. Since winding 34 embraces the entire cross sectional area of the core, this pulse applies unidirectional magnetomotive force to the entire core including both the inner and outer radial paths described above. FIG. 4 shows the familiar square type of hysteresis loop obtained by plotting flux density (B) versus magnetic field intensity (H) for a core of magnetic material such as is adaptable for use in practicing the present invention and with reference to which the operation of the cores shown in the disclosed embodiments will be hereafter described. The magnitude of the magnetomotive force applied by energizing winding 34 is sufficient to saturate the entire cross sectional area of the core with flux in the direction indicated by the arrows 38. This saturated condition is indicated in FIG. 4 by the letter "*a*." Upon the termination of the energizing pulse on reset winding 34, the loop of FIG. 4 is traversed from the saturated condition to the remanent condition designated "*b*." With the core in this condition, that is, with the flux throughout the entire core in a remanent condition with flux oriented in the clockwise direction indicated by arrows 38, the magnetic circuits of the binary half adder are ready for operation.

Input information to the circuit is in the form of signals supplied by the pulse sources 30 and 32 which are effective to apply current pulses, in the direction indicated, to the input windings 20 and 22. Considering the application of an energizing pulse to winding 20, exclusively, it can be seen that the magnetomotive forces applied by the figure eight portions of the winding are effective to apply a counterclockwise magnetomotive force to the inner radial portion of core 10 adjacent hole 12 and a clockwise magnetomotive force to the embraced outer radial portion of the core 10 adjacent opening 12. The applied magnetomotive force is therefore in a direction to reverse the direction of flux orientation in the inner radial portion adjacent the hole. It has been found that the application of such a magnetomotive force is effective to saturate a localized flux path around the hole with flux in a direction indicated by the arrow designated 40. The establishment of this saturated section, which encompasses the entire cross sectional area of the core 10 adjacent to hole 12, has an effect similar to that which would be expected if an air gap were thrust in that position. The very high reluctance offered by the saturated localized section has been found to be effective to "kidney" the flux in the remainder of the core. By this is meant that the direction of flux orientation in the inner portion of the core is remanently reversed and the direction of flux orientation in the outer portion of the core remote from the hole 12 remains unchanged. This is indicated by the arrows on the outer directional lines designated 42 which show that flux in the radial portion of core 10 remains in the original clockwise direction and the flux in the inner radial portion of core 10 is reversed to a counterclockwise direction. The portion of winding 20 which is threaded through hole 14 and embraces the adjacent outer radial portion of core 10 is effective to apply a counterclockwise magnetomotive force to this embraced portion, thereby causing a localized field around hole 14 to be established as indicated by the arrow 43. This localized flux has the same effect as that around hole 12 so that the "kidneying" of the flux is confined to the portions of the core 10 remote from these holes. Thus, the energization of input winding 20 is effective to cause a flux change in the counterclockwise direction in the inner radial portion of the core which is embraced by part of the figure eight sum output winding 26. This flux change induces a voltage across this winding resulting in the production of an output pulse at a sum output terminal 44 which output is, for the windings and direction of the input pulses shown, positive. Since the carry winding 24 embraces only the outer radial portion of the core, in which there is no flux change, there is no voltage induced in this winding and no output pulse appears at output terminal 45.

If, with the core in the reset condition with the flux direction being as indicated by arrows 38, the winding 22 is energized exclusively, the flux changes effected are similar. The figure eight portion of this winding threaded through hole 12 applies magnetomotive force in a clockwise direction to the inner adjacent portion of core 10 and magnetomotive force in a counterclockwise direction to the outer adjacent radial portion of the core. The effect is similar to that explained with reference to the exclusive energization of winding 20, a localized saturated flux condition being established around the periphery of hole 12 in the direction shown by the arrow 46. Though this localized saturation is in an opposite direction to that established by energizing winding 20, the result is the same, the saturated localized area being effective to "kidney" the flux to the condition shown by the arrows on the lines designated 42. Similarly the portion of winding 22, which is threaded through hole 14 to embrace the inner radial flux path when energized applies to the embraced portion of a clockwise path magnetomotive force which is effective to set up a localized condition of saturation around the hole 14 in the direction indicated by an arrow 50. This localized flux has the same effect as that around hole 12 so that the "kidneying" of the flux is confined to the portions remote from these holes. Thus, as with the energization of input winding 20, the energization of winding 22 is effective to cause a flux change in the inner portion of that part of the core, remote from the input holes, which is linked by the output windings, thereby producing an output at sum output terminal 44 and no output at carry terminal 45. Since the direction of flux change effected in the inner flux path is in both cases the same, the polarity of the output pulse developed at terminal 44 is the same when either input winding is energized exclusively. It should be noted that, since the magnetomotive force applied as the result of energization of either input winding exclusively is effective to produce flux only around the peripheries of the openings, the input pulses applied to these windings are not restricted in magnitude and may be as large as necessary to switch the element from one state to the other in exceedingly short time interval.

When, with the core reset to the remanent state, represented by the letter "*b*" in FIG. 4, both input windings 20 and 22 are energized coincidently, the flux in the entire core is reversed from the direction indicated by arrows 38 to that indicated by a pair of dotted arrows 52. This reversal is effected in the following manner. The windings 20 and 22 are, as previously stated, threaded through hole 12 in opposite senses so that, when coincidently energized with signals causing current flow in the direction indicated by the arrows on these windings, they are effective to cause equal and opposite magnetomotive forces to be applied to both the inner and outer radial flux paths embraced by these windings. These magnetomotive forces cancel each other and produce no flux change in the core. However, the input windings are threaded through hole 14 so that winding 20 embraces only the outer flux paths and winding 22 only the inner flux path. As indicated by the arrows 43 and 50, winding 20 is effective to apply a counterclockwise magnetomotive force to the outer flux path and winding 22 is effective to apply a counterclockwise magnetomotive force to the inner flux path. These magnetomotive forces are, with respect to the localized flux paths around the periphery of hole 14, in opposite directions, thus preventing the establishing of a localized saturated condition around the hole. As a result, the applied magnetomotive forces are applied effectively to the longer magnetic circuit paths around the core, with respect to which paths the magnetomotive forces are in the same direction, thereby causing the flux in the entire core to be reversed from the clockwise to the counterclockwise direction. The sum output winding 26 being wound in a figure eight fashion embraces the inner flux path with a winding loop of one sense and the outer flux path with a winding loop of the opposite sense. Since the direction of flux change is in the same direction in both pairs, equal and opposite voltages are induced in the two portions of winding 26. These voltages, though not occurring exactly at the same instant of time due to the fact that the flux change in the inner portion of the core is effected quicker than that in the outer portion, are sufficiently simultaneous to effectively cancel each other out and thereby prevent any output from being manifested at terminal 44. Upon coincident energization of windings 20 and 22, the flux is reversed throughout the entire core, and as a result, the carry winding which embraces only the outer flux path has induced therein a voltage effective to cause a carry output to be manifested at terminal 45.

As previously stated the reset winding 34, when energized, is effective to cause the core 10 to assume a state of polarization indicated in FIG. 4 by the letter "*a*" and upon termination of the reset pulse, the core 10 assumes the remanent state of polarization at point "*b*." When either of the input windings 20 or 22 is energized exclusively, the change in polarization, considering the core 10 as a whole, is first along the segment "*bc*" to a state where the total resultant polarization is substantially zero and thence up to the point "*d*." Point "*d*" represents the remanent state of polarization, again considering the core as a whole, which results from energizing either input winding exclusively to "kidney" the flux to the condition shown by the arrows on direction lines 42. When, with the core 10 initially in the remanent condition at point "*b*," both input windings are energized coincidently, the loop of FIG. 4 is traversed along the segment "*b*," and upon the termination of the input pulses assumes a state of remanent polarization at point "*f*," which represents the remanent state for the core 10 in the counterclockwise direction indicated by the arrows 52. Thus, it may be seen that where no input pulses are applied to the binary half adder the core 10 remains in the remanent condition indicated on FIG. 4 at "*b*"; that where either winding is energized exclusively, the core 10 assumes a stable state of polarization at point "*d*"; and that where both input windings are energized coincidently the core assumes a stable state of polarization at point "*f*." Each of these states are stable states of polarization and the core, after being addressed by any combination of inputs assumes a stable state of polarization which is representative of the binary addition of the inputs.

The result of the binary addition is, thus, stored in the core and may be reproduced at the output terminals at a later time by the application of an interrogation pulse, which in the present circuit may be the reset pulse applied by winding 34. Where no inputs have been applied and the core is in a state of polarization represented at "*b*," the energization of winding 34 causes the loop to be traversed to point "*a*" and upon termination of the pulse back to point "*b*." This excursion from "*b*" to "*a*" represents only a slight increase in the flux, in the clockwise direction throughout the entire core, which flux change induces equal and opposite voltages on the figure eight winding 26 and thus no output at terminal 44, and induces only an insignificant voltage on winding 24 and thus no significant output at terminal 45. When the reset pulse is applied with the core in the state of polarization at point "*d*," which represents the "kidney" flux condition effected by the exclusive energization of either input winding, the change in polarization is represented in FIG. 4 by the segment "*da*," and upon termination of the reset or interrogation pulse the core assumes the remanent state at point "*b*." This change in total polarization effected throughout the core 10 is caused by the reversal of the flux in the inner radial magnetic circuit path back to the clockwise direction, which change is effective to induce a voltage in the portion of winding 26 which embraces the inner path thereby causing an output to be manifested at sum output terminal 44. Where the coincident energization of the input windings has been effective to reverse the flux in the entire core to the counterclockwise direction indicated by arrow 52 and represented in FIG. 4 at point "*f*," the application of a reset pulse reverses the direction of flux throughout the entire core, the flux change being represented in FIG. 4 by the segment "*fa*." Upon termination of the reset pulse the core assumes the remanent state in the clockwise direction represented at point "*b*." Since the flux change represented by segment "*fa*" represents a large change in both the inner and outer magnetic circuits, winding 26 has induced therein equal and opposite voltages which cancel to prevent an output from being manifested at the sum output terminal 44, and winding 24, which embraces only the outer flux path, has induced thereon a voltage which causes an output pulse to be manifested at carry output terminal 45.

Summarily, as described above, the binary half adder is capable of both producing outputs at the sum and carry output terminals 44 and 45 which are indicative of the binary addition information signal applied to the input windings at the time the inputs are applied, and also storing the results of the binary addition in such a manner that it may be produced at a later time upon application of an interrogation pulse. It should be noted that, since the flux changes, which produce the outputs initially at the time of application of the input pulses and subsequently upon application of the reset or interrogation pulse, are in opposite direction, the outputs are of opposite polarity. The output pulses developed upon application of the input signals are, for the construction shown, positive and upon the application of the reset or interrogation pulse, are negative.

Figure 2:
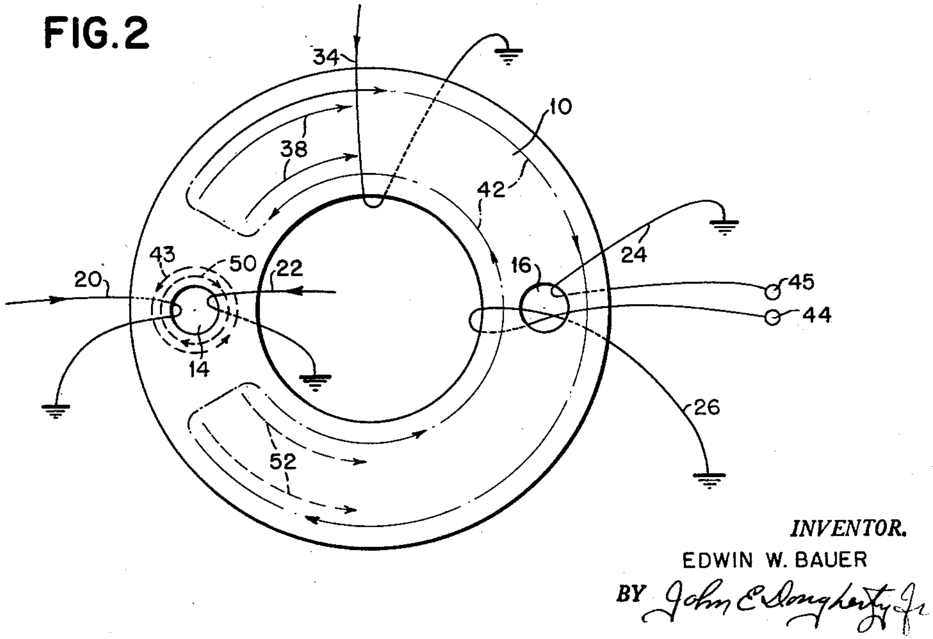

The embodiment shown in FIG. 2 is similar to that of FIG. 1 and its mode of operation is essentially the same, the basic difference between the two being that in the embodiment of FIG. 2 only one input hole and one output hole are provided. As before, the core 10 is reset to a remanent condition of flux density in the clockwise direction as indicated in FIG. 2 by the arrows 38 and in FIG. 4 at point "*b*." Input windings 20 and 22 are threaded through a hole 14 so that winding 20 embraces the outer flux path and winding 22 the inner flux path in the same manner as in the embodiment of FIG. 1. Both of the output windings 24 and 26 are threaded through hole 16 so that winding 24 again embraces only the outer flux path and the sum output winding 26 in figure eight fashion embraces the inner and outer flux paths with windings of opposite sense. The application of an input signal to either input winding is effective to apply a counterclockwise magnetomotive force to the embraced portion of core material so that in a manner similar to that described with reference to FIG. 1, the energization of either winding exclusively establishes a saturated field around hole 14 which is effective to "kidney" the flux in the portion of the core embraced by the output windings and coincident energization of both input windings is effective to reverse the flux direction in the entire core. Though threaded through the same hole 16, output windings 24 and 26 embrace core 10 in the same manner in the embodiment of FIG. 1, and the sum output winding has induced therein a voltage effective to cause an output to be manifested on terminal 44 when either winding is energized exclusively, and carry winding 24 has induced therein a voltage effective to cause an output to be manifested at terminal 45 when both input windings are energized coincidently. Also the application of a reset pulse is, in the same manner as we described with reference to FIG. 1, effective to cause to be manifested at terminals 44 and 45 outputs indicative of binary addition of the information previously applied to the input windings.

It should here be noted that the binary half adder may be constructed with two input holes and two output holes as is shown in FIG. 1 or with one input hole and one output hole as shown in FIG. 2, or may include two input holes and one output hole or two output holes and one input hole. In each case the windings may be wound in the manner shown in FIGS. 1 and 2. Further in any one of these cases the sum output winding 26 may be threaded in figure eight fashion through the input hole 14. In such a case, as is illustrated by the arrows 43 and 50, the energization of either input winding is effective to induce aiding voltages in both portions of the winding and the coincident energization of the input windings is effective to produce equal and opposite and thus cancelling voltages in the inner and outer portions of the figure eight winding. Where the sum output is wound in this manner, the output pulses, developed either upon application of an input or upon application of a reset pulse, are not unipolar, the output induced as the result of energizing one input winding being of opposite polarity to that induced as a result of energizing the other input winding.

Further note should be made of the fact that the righthand portion of the core in which the "kidneying" effect is produced, is larger in the embodiment of FIG. 2 than in the embodiment of FIG. 1. This is due to the fact that, in the embodiment of FIG. 1 there are two localized fields of saturation produced and in the embodiment of FIG. 2 there is only a single localized field of saturation produced. In either case the "kidneying" effect is achieved in the portion of the core remote from these localized fields. From this it might be seen that it is possible by properly spacing the holes threaded by the input winding to achieve "kidneying" effects in two separate portions of the cores and that the "kidneying" effect may be achieved in any particular portion or portions of the core by threading the energizing windings through holes pierced at selected positions in the core.

Figure 5:
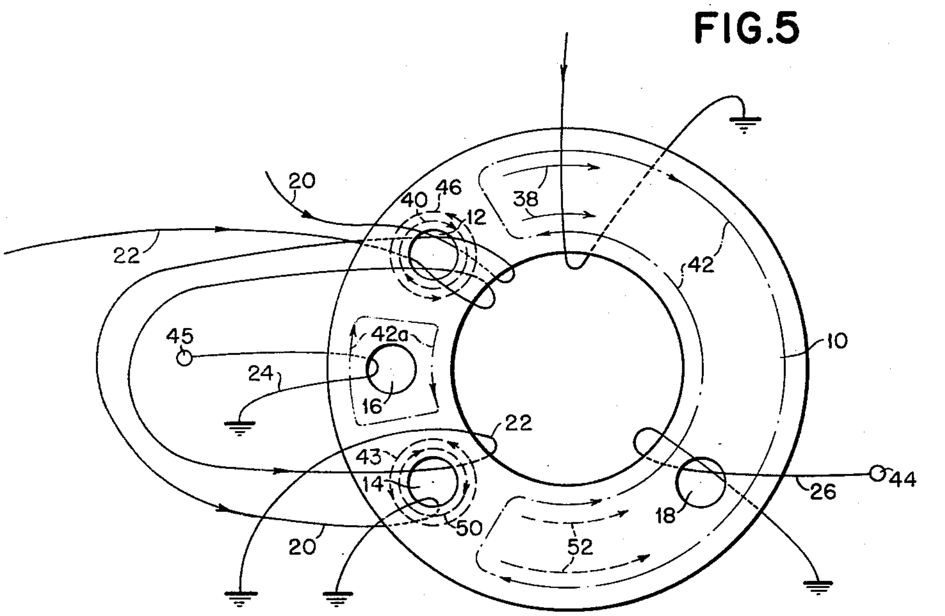
FIG. 5 is a schematic showing of another embodiment of the invention.

The embodiment shown in FIG. 5 illustrates the manner in which the "kidneying" effect achieved in different portions of a core may be utilized in accomplishing logical switching functions. Structurally the embodiment of FIG. 5 is the same as that of FIG. 1 with the single exception that the hole 16, through which the carry output winding 16 is positioned, has been pierced in a different portion of the core. The reference numerals on FIG. 5 are the same as those utilized on FIG. 1, the inputs being applied to windings 20 and 22, the sum output being induced on winding 26 and the carry output winding 24. The initial flux direction in the core is again indicated by arrows 38, and the flux state, resulting from a coincident energization of windings 20 and 22, by arrows 52. The arrows 42 indicate the "kidneying" effect achieved, in the section of core 10 extending in a clockwise direction from opening 12 to opening 14, as the result of the exclusive energization of either input winding. That there is a similar "kidneying" effect achieved, in the section of the core extending in counterclockwise direction from opening 12 to opening 14, upon exclusive energization of either of the input windings is indicated by arrows designated **42*a*. The "kidneying" produced in this section of the core is the same as tha produced in the other section of the core and thus the operation is the same as described with reference to FIG. 1. An output is induced in sum output winding 26, both initially and as a result of a subsequent energization of winding 34, when either input winding is energized exclusively, and an output is induced in carry output winding 24, both initially and upon subsequent energization of winding 34, when both inputs are energized coincidently. It should be noted that the sections of the core in which the "kidneying" effect is achieved is governed by the points at which the input openings 12 and 14** are positioned and that both output windings may be wound through a single opening, or as shown in FIG. 1 through separate openings positioned in the same portion of the core between the input winding openings, or as shown in FIG. 5 in different portions of the core between the input winding openings.

Figure 3:
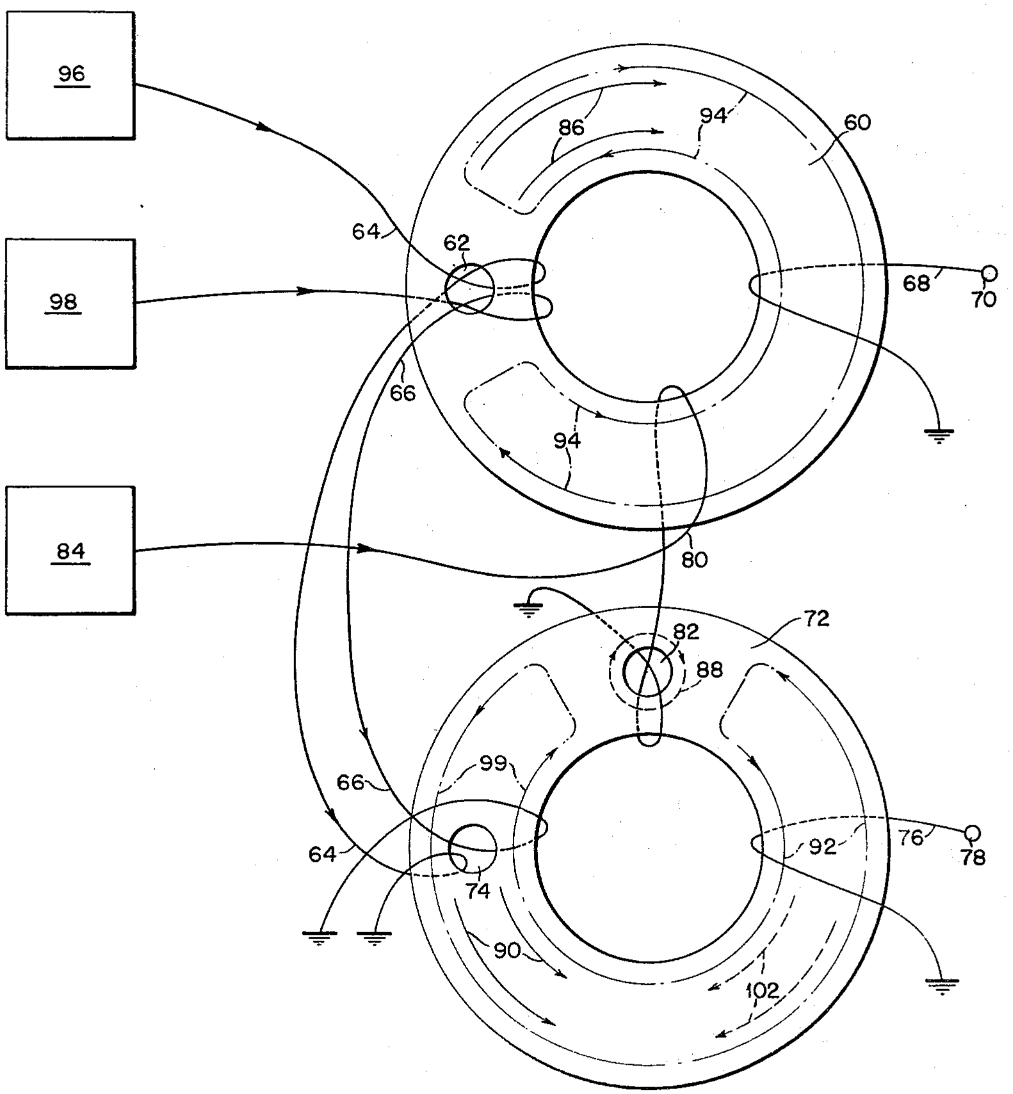
FIG. 3 is a schematic showing of another embodiment of the invention wherein two magnetic cores are utilized in constructing a binary half adder.

The embodiment shown in FIG. 3 is a two core binary half adder which is capable of operation with input current pulses of either polarity. One core 60 contains a singe hole 62 through which are threaded in figure eight fashion a pair of input windings 64 and 66. A single output winding 68 is provided on core 60 which winding, as shown, embraces the entire cross section of the core. Since, as will appear from the description to follow, the change in flux which produces the output in winding 68 occurs in the inner portion of the core, the winding 68 may be wound through a pierced hole to embrace only the inner portion of the core. Core 60 and the associated windings are effective to perform the logical "EXCLUSIVE OR" function and cause an output to be manifested at a sum output terminal 70 whenever either of the input windings 64 or 66 is engaged exclusively. The other core 72 is provided with an input hole 74, through which the input windings 64 and 66 are threaded so that winding 64 embraces the outer radial flux path and winding 66 embraces the inner radial flux path adjacent the hole. A single output winding 76 embraces the entire cross section of core 72 and is connected to an output terminal 78. Terminal 78 is the carry output terminal for the half adder and the core 72 and associated windings are effective to perform the logical "AND" function and cause an output to be manifested at this terminal whenever both of the input windings 64 and 66 are energized coincidently.

A reset winding 80 is wound to embrace the entire cross-sectional area of the "EXCLUSIVE OR" or sum output core 60 and is threaded in figure eight fashion through a hole 82 provided in the "AND" or carry output core 72. Reset winding 80 is pulsed by a pulse source 84, the construction of which is such that current, in the direction indicated by the arrow, is caused to flow through the reset winding. Energization of this winding is effective to saturate the core 60 with flux in the direction indicated by arrows 86, which is the condition represented by the letter "*a*" in the diagram of FIG. 4. Upon termination of the reset pulse, core 60 assumes a remanent state of polarization in this, the clockwise direction, which in FIG. 4 is a point "*b*." The energization of the reset winding, since it is threaded through hole 82 in core 72 in figure eight fashion, causes a localized condition of saturation in the direction indicated by arrow 88 to be established around hole 82. Assume the core 72 to have been initially at a remanent state of saturation in the counterclockwise direction which is the state which results from coincident energization of windings 64 and 66 with pulses in the direction indicated. The localized field applied by energizing winding 80 is effective to "kidney" the flux in the core to the condition indicated by arrows 92 with the flux along the inner radial path being reversed and the flux along the outer radial flux path remaining the same. The initial state of core 72 indicated by arrows 90 is represented at "*f*" in FIG. 4 and the "kidney" condition indicated by arrows 92 is represented at "*g*" in FIG. 4.

With the cores in this condition the application, by pulse sources 96 or 98, of an energizing current pulse to either input winding 64 or 66, exclusively, in the direction indicated establishes a local field of saturation around the hole 62 in core 60 through which each winding is threaded in figure eight fashion. This saturated field "kidneys" the flux in the remainder of the core to the condition shown in FIG. 3 by arrows 94 and represented in FIG. 4 at "*d*." Sum output winding 70 links the entire cross sectional area of the core and has induced therein as a result of the flux change in the inner radial flux path, a voltage effective to cause an output to be manifested at sum output terminal 70. Windings 64 and 66 are threaded through hole 62 to embrace both the inner and outer radial flux paths in an opposite sense so that, when both windings are energized coincidently, they apply equal and opposite magnetomotive forces to each path, which forces cancel each other. Thus, there is no flux change effected in the portion of the core embraced by winding 68 and no output produced at terminal 70.

The energization of either input winding exclusively has no effect on the flux in the portion of core 72 embraced by carry output winding 78, since such energization is effective only to set up localized changes around the periphery of hole 74 which do not change the remanent "kidney" condition represented by arrows 92. Where both windings are energized coincidently with current pulses in the direction shown, both the inner and outer radial flux paths are subjected to counterclockwise magnetomotive forces which are effective to reverse the flux direction in the inner radial flux path, thereby inducing a voltage in winding 76 effective to cause an output to be manifested at carry terminal 78. Winding 76 is wound on core 72 in the same manner as winding 68 on core 60 and, since the flux change in core 60 effected by an exclusive energization of one of the windings 64 or 66 and the flux change in core 72 effected by coincident energization of these windings are both in the same direction, the voltages induced in these windings are effective to produce pulses of like polarity at the output terminals 70 and 78, which pulses are, for the construction and current direction shown, of positive polarity.

The binary half adder of FIG. 3 is also capable of storing the result of the binary addition for reproduction when an interrogation pulse is applied. As in the embodiments of FIGS. 1 and 2, the interrogation pulse may be supplied by the reset winding. When there have been no inputs applied to the windings 64 and 66, the magnetic circuits of cores 60 and 72 remain in their initial reset condition, core 60 being in a state of polarization represented at "*b*" in FIG. 4 and core 72 being in a state of polarization represented at "*g*" in that figure. The application of a reset pulse to winding 80 with the cores in this condition produces no appreciable output at either output terminal. When either winding has been energized exclusively, core 72 remains in the reset condition at point "*g*" and core 60 is in the "kidney" condition represented at "*d*" in FIG. 4. The application of a reset pulse causes a flux change in core 60 from the state represented at point "*d*" to that at point "*a*" which flux change causes a voltage to be induced in winding 68 and an output to be manifested at terminal 70. Upon termination of the reset pulse, core 60 assumes the remanent state of polarization at point "*b*." When both windings have been energized coincidently, core 60 remains in the reset condition at point "*b*" and core 72 is at the remanent state represented at "*f*" in FIG. 4. The application of a reset pulse causes a flux change from the flux state at "*f*" in FIG. 4 to that represented by the letter "*h*" and thence to the remanent state at "*g*." This flux change from state "*f*" to state "*h*" causes a voltage to be induced in winding 76, and an output to be manifested at terminal 78. As was the case in the embodiments of FIGS. 1 and 2, the output pulses produced upon application of a reset pulse are opposite in polarity to those produced at the time input pulses are applied.

The embodiment of FIG. 3 is also operable where the input pulse sources 96 and 98 are constructed so that the pulses supplied thereby are effective to cause current to flow in a direction opposite to that indicated by the arrows on the windings 64 and 66 in FIG. 3. When such is the case, core 60 is, as before, initially reset to remanence in the clockwise direction indicated by arrows 86 in FIG. 2 and by the letter "*b*" in FIG. 4. The exclusive energization of either winding 64 or 66 is, as before, effective to "kidney" the flux in core 60 to condition "*d*" causing an output to be induced in winding 68 and manifested at terminal 70. When the windings 64 and 66 are coincidently energized the magnetomotive forces produced cancel each other around hole 62 and no output is produced at terminal 70.

When operated with input current pulses in the opposite direction to that shown, core 72 is initially considered to be at remanence in the clockwise direction as indicated, in FIG. 3, by the arrows 102 and in FIG. 4 at "*b*." The energization of reset winding with a current pulse in the direction shown "kidneys" the flux so that the core assumes the remanent state at point "*d*." In this condition the flux in the outer radial flux path is in the clockwise direction and the flux in the inner radial flux path is in the counterclockwise direction. As before, the energization of either input winding 64 or 66 has no effect but the coincident energization of these windings causes both the inner and outer flux paths to be subjected to clockwise magnetomotive forces, which results in a reversing of the flux in the inner flux path back to the clockwise direction. This flux change causes an output to be induced in winding 76 and manifested at terminal 78.

Since the direction of the flux changes which produce the outputs at terminal 78 are different for operation with input pulses of different polarities being applied to windings 64 and 66, the outputs developed at this terminal are also of different polarity. Thus, as before stated for the construction and direction of current flow shown, the pulses developed at terminals 70 and 78 upon energization of the input windings are positive whereas when operated with pulses causing current flow in a direction opposite to that shown, the pulses developed at terminal 70 are still positive but those developed at terminal 78 are of negative polarity.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A logical circuit comprising a magnetic core having first, second, third and fourth openings therethrough, said core being capable of assuming first, second and third different stable states of flux remanence, a pair of input windings inductively associated with said magnetic core, said pair of input windings being positioned through said first and second openings, means for energizing said input windings to thereby apply information to said magnetic core, each of said input windings being effective when input information is applied exclusively thereto when said magnetic core is in said first stable state to cause said magnetic core to assume said second stable state, said input windings being effective when input information is applied coincidently thereto when said magnetic core is in said first stable state to cause said magnetic core to assume said third stable state, and a pair of output windings inductively associated with said magnetic core for respectively manifesting outputs indicative of the information applied to said core by said input windings, one of said output windings being positioned through said third opening to link a portion of said core on one side of said third opening, the other of said output windings being positioned through said fourth opening to link portions of said core on both sides of said fourth opening in opposite senses.

2. A magnetic circuit comprising first and second magnetic cores each having an opening therethrough, said magnetic circuit being capable of assuming first, second and third different stable states, a pair of input windings each positioned through said opening in said first core and each positioned through said opening in said second core, means for energizing said input windings to thereby apply information to said circuit, each of said windings being effective when input information is applied exclusively thereto when said circuit is in said first stable state to cause said circuit to assume said second stable state, said input windings being effective when input information is applied coincidently thereto when said circuit is in said first stable state to cause said circuit to assume said third stable state, a first output winding inductively associated with said first core only, and a second output winding inductively associated with said second core only.

3. In a logical circuit, a first magnetic core circuit capable of assuming at least two different states of flux remanence and normally in the one of said states, a second magnetic core circuit capable of assuming at least two different states of flux remanence and normally in one of said states, a pair of input windings inductively associated with each of said circuits, means for energizing said input windings, each of said windings being effective when energized exclusively to switch said first magnetic core circuit to the other of said two different remanent states it is capable of assuming, said windings when energized coincidently being capable of switching said second magnetic core circuit to the other of said two different remanent states it is capable of assuming, a winding inductively associated with said first magnetic core circuit for manifesting an output when said first circuit is switched from one of said two different remanent states to the other, and a winding inductively associated with said second magnetic core circuit for manifesting an output when said second magnetic circuit is switched from one of said two different remanent states to the other.

4. In a logical circuit, a first flux path of magnetic material capable of existing in an unbiased condition in at least first and second stable states of flux remanence, a second flux path of magnetic material capable of existing in an unbiased condition in at least first and second stable states of flux remanence, a pair of input windings inductively associated with each of said flux paths, means for energizing said input windings, each of said windings being effective when energized exclusively when said first flux path is in said first stable state to switch said first flux path to said second stable state, said windings being effective when energized coincidently when said second flux path is in said first stable state to switch said second flux path to said second stable state, a further winding inductively associated with each of said flux paths effective when energized when said first flux path is in said second stable state to switch said first flux path to said first stable state and effective when energized when said second flux path is in said second stable state to switch said second flux path to said first stable state, a first output winding inductively associated with said first flux path effective to manifest an output when said first flux path only is switched from either of said stable states to the other of said stable states it is capable of assuming, and a second output winding inductively associated with said second flux path effective to manifest an output when said second flux path is switched from either of said stable states to the other of said stable states it is capable of assuming.

5. The invention as claimed in claim 4 wherein a single magnetic core includes both said first and second magnetic flux paths.

6. The invention as claimed in claim 4 wherein a first magnetic core includes said first flux path and a second magnetic core includes said second flux path.

7. A logical circuit comprising a magnetic circuit capable of assuming first, second and third different stable states of flux remanence, a pair of input windings inductively associated with said magnetic circuit, means for energizing said input windings, said input windings when said magnetic circuit is in said first stable state being effective when either is energized exclusively to cause said magnetic circuit to assume said second stable state and when both are energized coincidently to cause said magnetic circuit to assume said third stable state, further winding means inductively associated with said magnetic circuit effective when energized to cause said magnetic circuit to assume said first stable state, and a pair of output windings inductively associated with said magnetic circuit effective upon energization of said further winding means to manifest outputs indicative of whether said input windings were energized exclusively or coincidently.

8. In a logical circuit for storing the results of information applied thereto, a pair of windings, means for energizing said windings to apply input information to said logical circuit, a magnetic circuit including first and second magnetic cores each defining a fixed flux path and each capable of existing in at least two different stable states of flux remanence, said magnetic circuit being normally in a first stable state of flux remanence but responsive to exclusive energization of either of said windings to assume a second stable state of flux remanence and to coincident energization of said windings to assume a third stable state of flux remanence, an interrogation winding inductively associated with said magnetic circuit, means for energizing said interrogation winding, first and second individual output winding means, each inductively associated with a different one of said magnetic cores, for respectively manifesting outputs indicative of which of said stable states said magnetic circuit is in when said interrogation winding is energized.

9. A magnetic logical device comprising a magnetic circuit having a portion thereof divided into at least first and second auxiliary flux paths and a further portion divided into at least third and fourth auxiliary flux paths, first and second input winding means embracing said first and second auxiliary flux paths, respectively, output means including third and fourth winding means, said third winding means embracing said third auxiliary flux path only, said fourth winding means having winding loops embracing said third and said fourth auxiliary flux paths in opposite senses.

10. A pulse transfer controlling device comprising a core of magnetic material, a first winding means for establishing a magnetic flux in a first portion of said magnetic core, a second winding means for establishing a magnetic flux in a second portion of said magnetic core parallel to and adjacent said first portion, third winding means embracing a third portion of said magnetic core remote from said first and second portions, and output means including a fourth winding means embracing with windings of opposite sense fourth and fifth portions of said core remote from said first and second portions, each of said third, fourth and fifth portions comprising less than the complete flux path provided by said magnetic core.

11. In a logical circuit, a magnetic element having first and second segments thereof each divided into at least first and second parallel flux paths, a first input winding embracing a portion of said element forming a part of said first flux path of said first segment, a second input winding embracing a portion of said element forming a part of said second flux path of said first segment, a first output winding embracing with turns of opposite sense portions of said core forming parts of said first and second flux paths of said second segment, and a second output winding embracing the one of said first and second flux paths of said second segment which has the greater flux path length.

12. In a logical circuit, a magnetic element having a segment thereof divided into at least first and second parallel flux paths, said first flux path having a flux path length greater than that of said second flux path, said segment being capable of assuming first, second and third different stable states of flux remanence, means inductively associated with said element for causing said element to assume said first stable state, a pair of input windings inductively associated with said element, means for energizing said input windings to cause said segment to assume one or the other of said second and third states of flux remanence according to the time relationship in which said input windings are energized, a first output winding embracing with windings of opposite sense portions of said segment forming parts of said first and second flux paths, and a second output winding embracing a portion of said segment forming a part of the one of said first and second flux paths which has the greater flux path length.

13. In a logical circuit, a magnetic element having a segment thereof divided into at least first and second parallel flux paths, said segment being capable of assuming first, second and third different stable states of flux remanence, means inductively associated with said element for causing said element to assume said first stable state, a pair of input windings inductively associated with said element, means for energizing said input windings to cause said segment to assume one or the other of said second and third states of flux remanence according to the time relationship in which said input windings are energized, a first output winding embracing with windings of opposite sense portions of said segment forming parts of said first and second flux paths, and a second output winding embracing a portion of said segment forming a part of said first flux path.

14. A binary half adder comprising an element of magnetic material defining a closed flux path having first, second, third and fourth openings therethrough, first and second input windings positioned through said first openings so that each embraces a portion of said core on each side of said first opening and positioned through said second opening so that said first input winding embraces a portion of said core on one side of said second opening and said second input winding embraces a portion of said core on the other side of said second opening, means for energizing said first and second input windings, a first output winding positioned through said third opening so as to embrace portions of said core on each side of said third opening, a second output winding positioned through said fourth opening so as to embrace a portion of said core on one side of said fourth opening, a first output terminal coupled to said first output winding for manifesting an output when either of said input windings is energized exclusively, and a second output terminal coupled to said second output winding for manifesting an output when said input windings are energized coincidently.

15. In a logical circuit, a magnetic element having first and second segments thereof divided into at least first and second parallel flux paths, said second segment being capable of assuming first, second and third stable states of flux remanence, the flux in both of said parallel flux paths of said second segment being in a first direction when said segment is in said first state and in a second direction when said segment is in said second state, said flux in said first flux path of said second segment being in said first direction and said flux in said second flux path of said second segment being in said second direction when said second segment is in said third state, a first winding embracing a portion of said element forming a part of said first flux path of said first segment, a second winding embracing a portion of said element forming a part of said second flux path of said first segment, means for energizing said windings, said windings being effective when either is energized exclusively to cause said second segment to assume said third state and when both are energized coincidently to cause said second segment to assume said second state, a third winding embracing a portion of said element effective when energized to cause said second segment to assume said first state, a fourth winding embracing with turns of opposite sense portions of said element forming parts of said first and second flux paths of said second segment, and a fifth winding embracing a portion of said element forming a part of the one of said first and second flux paths of said second segment which has the greater flux path length.

16. A binary half adder comprising first and second magnetic cores each capable of assuming at least two stable states of flux remanence, a pair of input windings inductively associated with each of said cores, means for energizing said input windings, said windings being effective when either is energized exclusively to switch said first core from one of the stable states to another of the stable states it is capable of assuming, said windings being effective when energized coincidently to switch said second core from one of the stable states to another of the stable states it is capable of assuming, a first output winding inductively associated with said first core for manifesting an output indicative of an exclusive energization of either of said windings, and a second output winding inductively associated with said second core for manifesting an output indicative of a coincident energization of said windings.

17. In a magnetic circuit for storing logical results of information applied thereto, a pair of input windings inductively associated with said circuit, means for energizing said input windings to apply input information to said circuit,said magnetic circuit being capable of assuming at least first, second and third distinguishably different stable states of flux remanence and normally in said first state but responsive to exclusive energization of either of said input windings to assume said second state and to coincident energization of said windings to assume said third state, and output means including a pair of windings inductively associated with said magnetic circuit for manifesting distinguishable outputs indicative of said three different stable states.

18. A logical circuit comprising a core of magnetic material having first and second openings therethrough dividing said core into first and second parallel flux paths, first and second input winding means for producing flux changes in said core, each of said input winding means being positioned through each of said openings to embrace one only of said flux paths at a point adjacent one of said openings and one of said flux paths in one sense and the other of said flux paths in the opposite since at a point adjacent said second opening, and output winding means embracing at least one of said flux paths.

19. A logical circuit comprising a core of magnetic material having first and second openings therethrough dividing said core into first and second parallel flux paths, first and second input winding means for producing flux changes in said core, each of said input winding means being positioned through each of said openings to embrace at least one of said flux paths at a point adjacent said first opening and one of said flux paths at a point adjacent said second opening, first output winding means embracing said first flux path only, and second output winding means embracing with turns of opposite sense said first and second flux paths.

20. An EXCLUSIVE OR circuit comprising a core of a magnetic material in which flux may be remanently oriented in first and second directions, said core having an opening therethrough dividing a portion thereof into first and second flux paths, means for orienting the flux throughout said core in said first direction, first and second input means inductively associated with said core and each effective when energized exclusively when said flux is oriented in said first direction to reverse the direction of flux orientation in only said first flux path of said portion of said core and effective when coincidently energized to reverse the direction of flux orientation in both of said first and second flux paths, and a figure eight output winding means positioned through said opening to link said first and second flux paths in opposite senses.

21. An EXCLUSIVE OR circuit comprising a core of a magnetic material having an opening therethrough dividing a portion thereof into first and second flux paths, first and second input winding means inductively associated with said core for producing flux changes in said portion of said core including said first and second flux paths, and output winding means positioned through said opening to embrace said first and second flux paths with turns of opposite sense.

22. A magnetic logical device comprising a magnetic core having a portion thereof divided into at least first and second auxiliary flux paths and a further portion divided into at least third and fourth auxiliary flux paths, first and second input winding means embracing said first and second auxiliary flux paths, respectively, and figure eight output winding means having turns embracing said third and said fourth auxiliary flux paths in opposite senses.

23. A magnetic circuit comprising a core of a magnetic material in which flux may be remanently oriented in first and second directions, said core having an opening therethrough dividing a portion thereof into first and second flux paths, input winding means inductively associated with said core for selectively remanently reversing the direction of flux orientation in one or both of said first and second flux paths, and figure eight output winding means positioned through said opening for producing outputs indicative of whether the direction of flux orientation is reversed in one or both of said flux paths.

24. A magnetic circuit comprising a core of magnetic material, input winding means inductively associated with said core, means for applying information representing signals to said input winding means to produce flux changes in a predetermined portion of said core in accordance with the information represented by said signals, and a figure eight output winding inductively associated with said portion of the core for producing outputs indicative of the information signals applied to said input winding means.

25. The circuit of claim 17 wherein said magnetic circuit comprises a single core of magnetic material capable of assuming first, second and third distinguishably different stable states of flux remanence.

26. The circuit of claim 17 wherein said magnetic circuit includes first and second magnetic cores each capable of assuming two different states of flux remanence.

References Cited in the file of this patent

UNITED STATES PATENTS

| | | |
|---|---|---|
| 2,696,347 | Lo | Dec. 7, 1954 |
| 2,733,424 | Chen | Jan. 31, 1956 |
| 2,734,182 | Rajchman | Feb. 7, 1956 |
| 2,810,901 | Crane | Oct. 22, 1957 |
| 2,814,792 | Lamy | Nov. 26, 1957 |
| 2,818,555 | Lo | Dec. 31, 1957 |
| 2,842,755 | Lamy | July 8, 1958 |
| 2,869,112 | Hunter | Jan. 13, 1959 |
| 2,905,834 | Arsenault | Sept. 22, 1959 |
| 2,919,430 | Rajchman | Dec. 29, 1959 |
| 2,994,069 | Rajchman et al. | July 25, 1961 |

OTHER REFERENCES

"A New Nondestructive Read for Magnetic Cores" (Arsenault), 1955, Western Joint Computer Conference, August 1955, pp. 111–116.

"The Transfluxor" (Rajchman), Proceedings of the IRE, vol. 44, issue 3, March 1956, pp. 321–332.